US012688114B2

(12) United States Patent
Mishra et al.

(10) Patent No.: US 12,688,114 B2
(45) Date of Patent: Jul. 21, 2026

(54) SYSTEM AND METHOD FOR PROVIDING EMULATION AS A SERVICE FRAMEWORK FOR COMMUNICATION NETWORKS

(71) Applicant: Tata Consultancy Services Limited, Mumbai (IN)

(72) Inventors: Garima Mishra, Bangalore (IN); Samar Shailendra, Bangalore (IN); Hemant Kumar Rath, Bhubaneswar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1115 days.

(21) Appl. No.: 17/653,523

(22) Filed: Mar. 4, 2022

(65) Prior Publication Data

US 2022/0365866 A1 Nov. 17, 2022

(30) Foreign Application Priority Data

Apr. 7, 2021 (IN) .............................. 202121016401

(51) Int. Cl.
    G06F 9/455 (2018.01)
    G06F 11/30 (2006.01)
    (Continued)

(52) U.S. Cl.
    CPC .......... G06F 11/3652 (2013.01); G06F 9/455 (2013.01); G06F 11/3068 (2013.01); G06F 11/3457 (2013.01); *G06N 20/00* (2019.01)

(58) Field of Classification Search
    CPC .. G06F 11/3652; G06F 9/455; G06F 11/3068; G06F 11/3457; G06N 20/00;
    (Continued)

(56) References Cited

U.S. PATENT DOCUMENTS

| | | | |
|---|---|---|---|
| 9,819,540 B1 | 11/2017 | Bahadur et al. | |
| 10,805,171 B1 * | 10/2020 | Anwer ................ | H04L 41/0894 |
| 2020/0192707 A1 | 6/2020 | Brooker et al. | |

FOREIGN PATENT DOCUMENTS

| CN | 104995614 B | 4/2018 |
|---|---|---|

OTHER PUBLICATIONS

Midoglu et al. "Large scale "speedtest" experimentation in Mobile Broadband Networks" Computer Networks vol. 184 (Published Nov. 2020) (2021) (Year: 2020).*

(Continued)

*Primary Examiner* — Emerson C Puente
*Assistant Examiner* — Alfred H B Wechselberger
(74) *Attorney, Agent, or Firm* — FINNEGAN, HENDERSON, FARABOW, GARRETT & DUNNER LLP

(57) ABSTRACT

Emulation has become a critical method for the initial phase of verification and validation processes. However, achieving interoperability between emulation systems and ensuring credibility of results currently require significant efforts. This disclosure relates to a system and method for providing an emulation as a service (EaaS) framework for communication networks. The EaaS framework provides discoverable services that are readily available on-demand and deliver a choice of applications in a flexible and adaptive manner. The EaaS framework is used for discovery, composition, execution, and management of emulation services. The EaaS framework defines user-facing capabilities (front-end) and underlying core functional infrastructure (back-end). The front end provides access to a large variety of emulation capabilities from which the user is able to select the services and track the experiences.

7 Claims, 7 Drawing Sheets

(51) Int. Cl.
G06F 11/34 (2006.01)
G06F 11/362 (2025.01)
G06N 20/00 (2019.01)

(58) Field of Classification Search
CPC . H04L 41/0853; H04L 41/0894; H04L 41/12;
H04L 41/145; H04L 41/16; H04L 41/147;
H04L 41/0893; H04L 41/122; H04L
41/34; H04L 41/342; H04L 41/344; H04L
41/40; H04L 41/149
See application file for complete search history.

(56) References Cited

OTHER PUBLICATIONS

Guruprasad, S. "Issues in Integrated Network Experimentation Using Simulation and Emulation" [Thesis] Master of Science, The University of Utah (Year: 2005).*

Liebetraut et al. "Emulation-as-a-Service—The Past in the Cloud" 2014 IEEE International Conference on Cloud Computing; DOI: 10.1109/CLOUD.2014.124 [retrieved on Mar. 30, 2026] (Year: 2014).*

Coutinho et al. "Fogbed: A Rapid-Prototyping Emulation Environment for Fog Computing" 2018 IEEE International Conference on Communications (ICC); DOI: 10.1109/ICC.2018.8423003 [retrieved on Mar. 30, 2023] (Year: 2018).*

Ahrenholz et al. "Integration of the Core and Emane Network Emulators" The 2011 Military Communications Conference—Track 5—Communications and Network Systems; DOI: 10.1109/MILCOM.2011.6127585 [retrieved on May 17, 2025] (Year: 2011).*

* cited by examiner

300

Business Process + Consumer Layer

Services Layer

Service Components Layer

Operational Systems Layer

Emulation Environment Layer

Orchestration Layer

Integration Layer

Information Layer

Security Layer

400

Start

User Input (Template File)

Parse the user input parameters to define the netwok topology

Generate emulation script

Execute emulation script in emulator

Integrate emulated nodes with real devices

Is emulation over ?

No

Display Status

Yes

A

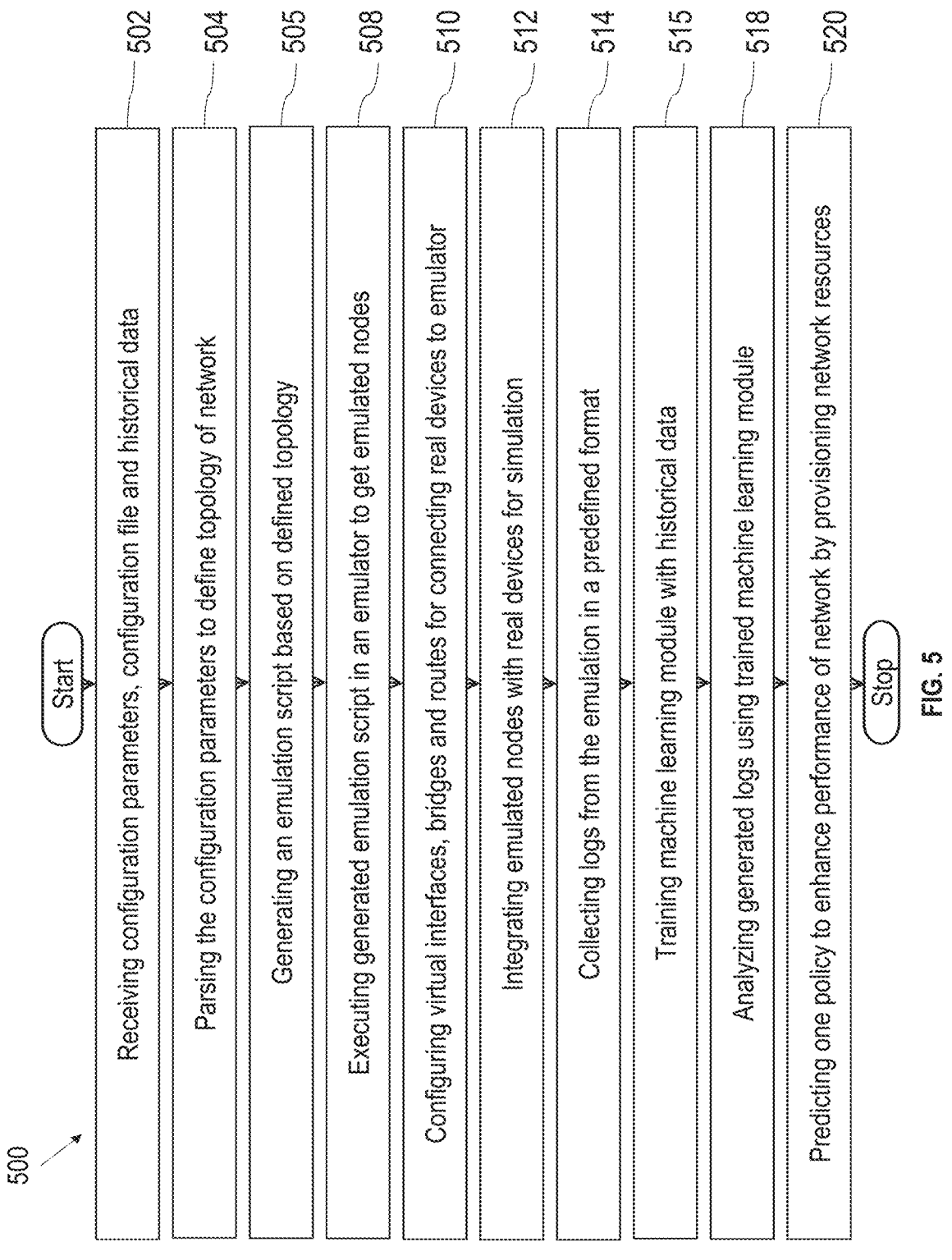

500

Start

Receiving configuration parameters, configuration file and historical data — 502

Parsing the configuration parameters to define topology of network — 504

Generating an emulation script based on defined topology — 505

Executing generated emulation script in an emulator to get emulated nodes — 508

Configuring virtual interfaces, bridges and routes for connecting real devices to emulator — 510

Integrating emulated nodes with real devices for simulation — 512

Collecting logs from the emulation in a predefined format — 514

Training machine learning module with historical data — 515

Analyzing generated logs using trained machine learning module — 518

Predicting one policy to enhance performance of network by provisioning network resources — 520

Stop

FIG. 5

SYSTEM AND METHOD FOR PROVIDING EMULATION AS A SERVICE FRAMEWORK FOR COMMUNICATION NETWORKS

CROSS-REFERENCE TO RELATED APPLICATIONS AND PRIORITY

This U.S. patent application claims priority under 35 U.S.C. § 119 to India Application No. 202121016401, filed on Apr. 7, 2021. The entire content of the abovementioned application is incorporated herein by reference.

TECHNICAL FIELD

The disclosure herein generally relates to the field of emulation and more specifically, to a system and method for providing an emulation as a service (EaaS) framework for communication networks.

BACKGROUND

A lot of industries and academia use communication network emulation and simulation environments for various purposes, such as training, capability demonstration, decision making and decision support etc. Although simulated communication networks are scalable and do not involve deployment cost, they do not provide real-time analysis. Whereas emulation is a hybrid solution of simulation and physical testbed. In case of an emulated communication network, physical devices are integrated with the simulated communication network and analysis is performed in real-time. Emulation has become a critical method for the initial phase of verification and validation processes. However, achieving interoperability between emulation systems and ensuring credibility of results currently require significant efforts.

The existing solutions for emulation are tightly coupled to some specific solutions and do not provide any single touch provisioning. Moreover, the existing solutions focus more on manufacturing and product designing aspects. Hence, there is a need to build an adaptable emulation framework which can provide an interface to accept user input and generate the customized script to optimize the communication network and provide predictive and prescriptive analytics. The existing emulation tools are supposed to be customized to automate the complete end-to-end emulation process by reducing manual intervention and repetitive tasks.

Traditionally, the large mismatch of the emulation results from the physical testbeds have been a deterrent for wider acceptability of the emulations methods. However, with the enhancement into virtualization of communication network functions, the communication networking functionalities are decoupled from the underlying hardware. This decoupling further enhances the prospects of communication network and application emulation and provides closer results to the physical testbed. The software-based verification in real-time emulation is changing the communication networking field. They bring several benefits especially in terms of scalability and flexibility. Various emulation capabilities can be exposed as an Application Program Interfaces (APIs) to the users to better utilize them remotely and increase the interoperability between different emulation tools.

The existing solutions lack interoperability between different Emulation tools. At present there is no common framework available which provides a northbound interface to the users and a southbound interface to integrate and support different emulators. Therefore, interoperability with the existing set of communication network devices and different emulation tools is a challenging task.

SUMMARY

Embodiments of the disclosure present technological improvements as solutions to one or more of the above-mentioned technical problems recognized by the inventors in conventional systems. For example, in one embodiment, a system and method for providing an emulation as a service (EaaS) framework for communication networks is provided.

In one aspect, a processor-implemented method for providing an emulation as a service (EaaS) framework for communication networks is provided. The method includes one or more steps such as receiving one or more configuration parameters of a communication network, a configuration file from a user and historical data of at least one emulation from one or more databases, wherein the communication network comprising one or more resources, and parsing the received one or more configuration parameters of the communication network to define a topology of the communication network based on the received configuration file. Further, the method includes generating an emulation script based on the defined topology of the communication network using a code generator and executing generated emulation script in an emulator to get one or more emulated nodes.

Furthermore, the method includes configuring one or more virtual interfaces, one or more bridges, and one or more routes for connecting at least one physical device to the emulator and integrating one or more emulated nodes with at least one physical device. The at least one physical device participates in a simulation and allows one or more simulation nodes to send and receive packets over a physical communication network in real-time. Further, method includes collecting one or more logs from the emulation in a predefined format, training a Machine Learning (ML) module with historical data from the at least one database to get a trained ML model, analyzing the generated one or more logs using the trained ML model and predicting at least one policy to enhance performance of the communication network by provisioning one or more communication network resources based on the analysis output. The, historical data is a data which was stored previously in database for a similar setup.

In another aspect, a system for providing an emulation as a service (EaaS) framework for communication networks is provided. The system includes an input/output interface to receive one or more configuration parameters of a communication network, applications to be used for emulation and a configuration file from a user, wherein the communication network comprising one or more resources, one or more hardware processors and at least one memory storing a plurality of instructions, wherein the one or more hardware processors are configured to execute the plurality of instructions stored in the at least one memory.

Further, a parsing module of the system is configured to parse the received one or more configuration parameters of the communication network to define a topology of the communication network based on the received configuration file and a code generator is configured to generate an emulation script based on the defined topology of the communication network. An emulator of the system is configured to execute the generated emulation script to get one or more emulated nodes. Furthermore, the emulator is used to configure one or more virtual interfaces, one or more bridges, and one or more routes to integrate one or more emulated nodes with at least one physical device. The at least one physical device participates in a simulation and allows one or more simulation nodes to send and receive packets over a physical communication network in real-time. A collection module of the system is configured to collect one or more logs from the emulation in a predefined format and a machine learning module is trained with the collected one or more logs, wherein the collected one or more logs are used for prescribing the communication network configuration. Further, the trained ML model of the system is configured to analyze the generated one or more logs and historical data stored in a database to predict at least one policy to enhance performance of the communication network by provisioning one or more communication network resources using the trained ML model.

In yet another aspect, there are provided one or more non-transitory machine-readable information storage mediums comprising one or more instructions, which when executed by one or more hardware processors causes a method for providing an emulation as a service (EaaS) framework for communication networks. The method includes one or more steps such as receiving one or more configuration parameters of a communication network, a configuration file from a user and historical data of at least one emulation from one or more databases, wherein the communication network comprising one or more resources, and parsing the received one or more configuration parameters of the communication network to define a topology of the communication network based on the received configuration file. Further, the method includes generating an emulation script based on the defined topology of the communication network using a code generator and executing generated emulation script in an emulator to get one or more emulated nodes.

Furthermore, the method includes configuring one or more virtual interfaces, one or more bridges, and one or more routes for connecting at least one physical device to the emulator and integrating one or more emulated nodes with at least one physical device. The at least one physical device participates in a simulation and allows one or more simulation nodes to send and receive packets over a physical communication network in real-time. Further, method includes collecting one or more logs from the emulation in a predefined format, training a Machine Learning (ML) module with historical data from the at least one database to get a trained ML model, analyzing the generated one or more logs using the trained ML model and predicting at least one policy to enhance performance of the communication network by provisioning one or more communication network resources based on the analysis output. The, historical data is a data which was stored previously in database for a similar setup.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 is a flow diagram to illustrate a method for providing an emulation as a service (EaaS) framework, according to an embodiment of the present disclosure.

Figure 1:
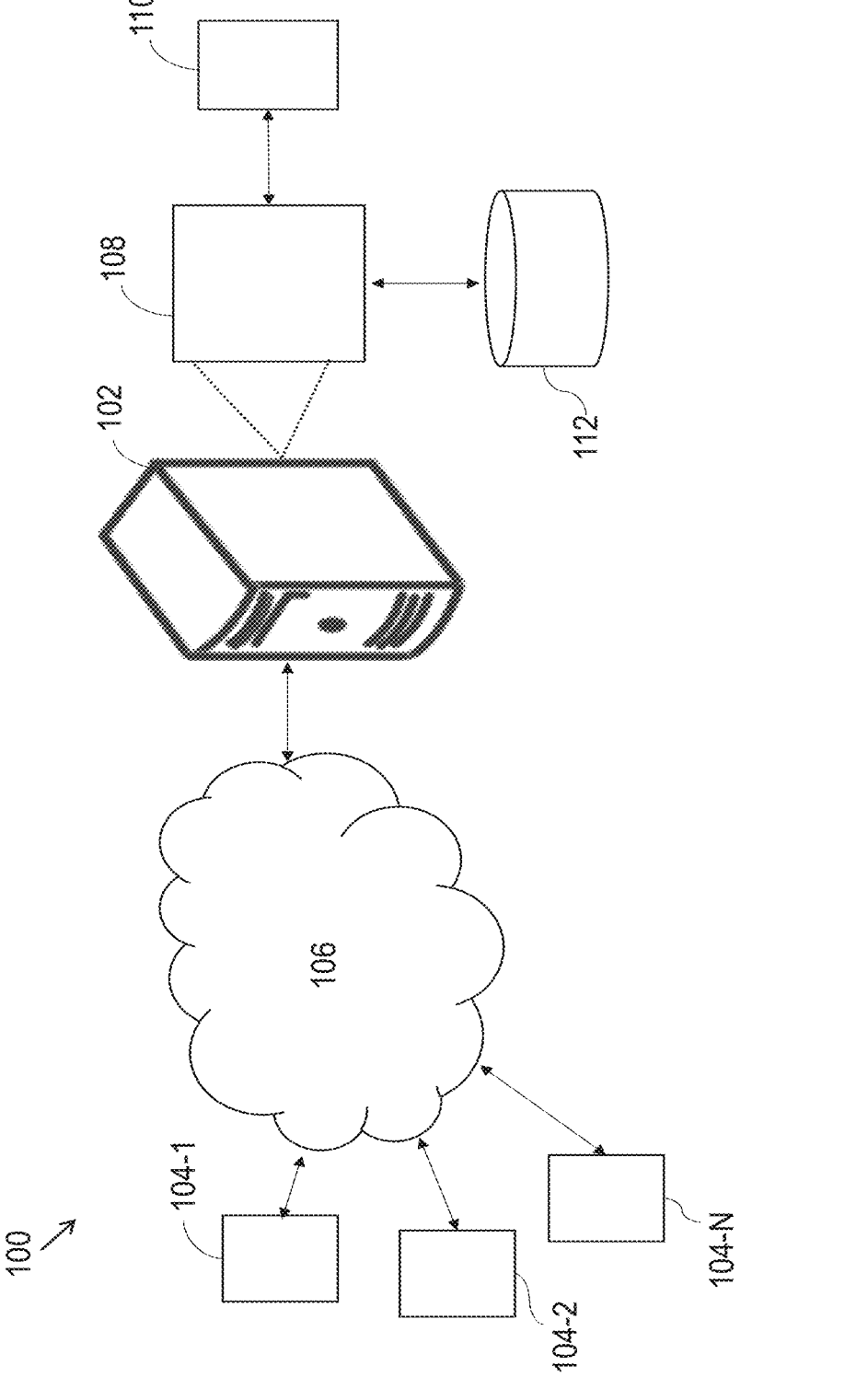
FIG. 1 illustrates an exemplary system for providing an emulation as a service (EaaS) framework, according to an embodiment of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a system and method for providing an emulation as a service (EaaS) framework for communication networks. It would be appreciated that the EaaS aims to provide a user with discoverable services that are readily available on-demand and deliver a choice of applications in a flexible and adaptive manner. It includes advantages over the traditional emulation paradigm in which the users are highly dependent on a limited amount of industry partners and subject matter experts. The allied framework for the EaaS defines user-facing capabilities (front-end) and underlying core functional infrastructure (back-end). The front end is called an EaaS portal. The front end provides access to a large variety of emulation capabilities from which the user is able to select the services that best suit their requirements and track the experiences.

The EaaS framework having reconfigurable modular components. These components are integrated with a uniform Service Oriented Architecture (SOA) based approach to standardize the way EaaS would expose its offerings to the users. The SOA-based architectures are model-driven and adapt reusable developments to emphasis on collaborative processes. In EaaS, hardware or physical devices such as sensors, controllers, access points, stations etc. are one of the major modular components and because of SOA-based design approach, these hardware components interact transparently with other layers via some services. The SOA based framework for the EaaS is like a linking agent between users and the service providers by providing the layered abstraction for discovery, composition, and execution of various services. The North Atlantic Treaty Organization (NATO)

Modelling and Simulation Group (MSG) has defined a vision for modelling and simulation as a service such that it's products and processes can be made available and accessible on-demand to the remote users to increase operational benefits.

Herein, the proposed EaaS framework enables coherent and effective emulation services by providing a seamless, reliable, and consistent emulation capability that is scalable and adaptable in a distributed system. Further, it makes emulation services accessible on-request to the remote users via an Application Programming Interface (API) implemented as a RE-presentational State Transfer (REST) full web series and the server resources such as multiple service instances or data storage are provisioned automatically as per the need basis.

Figure 6:
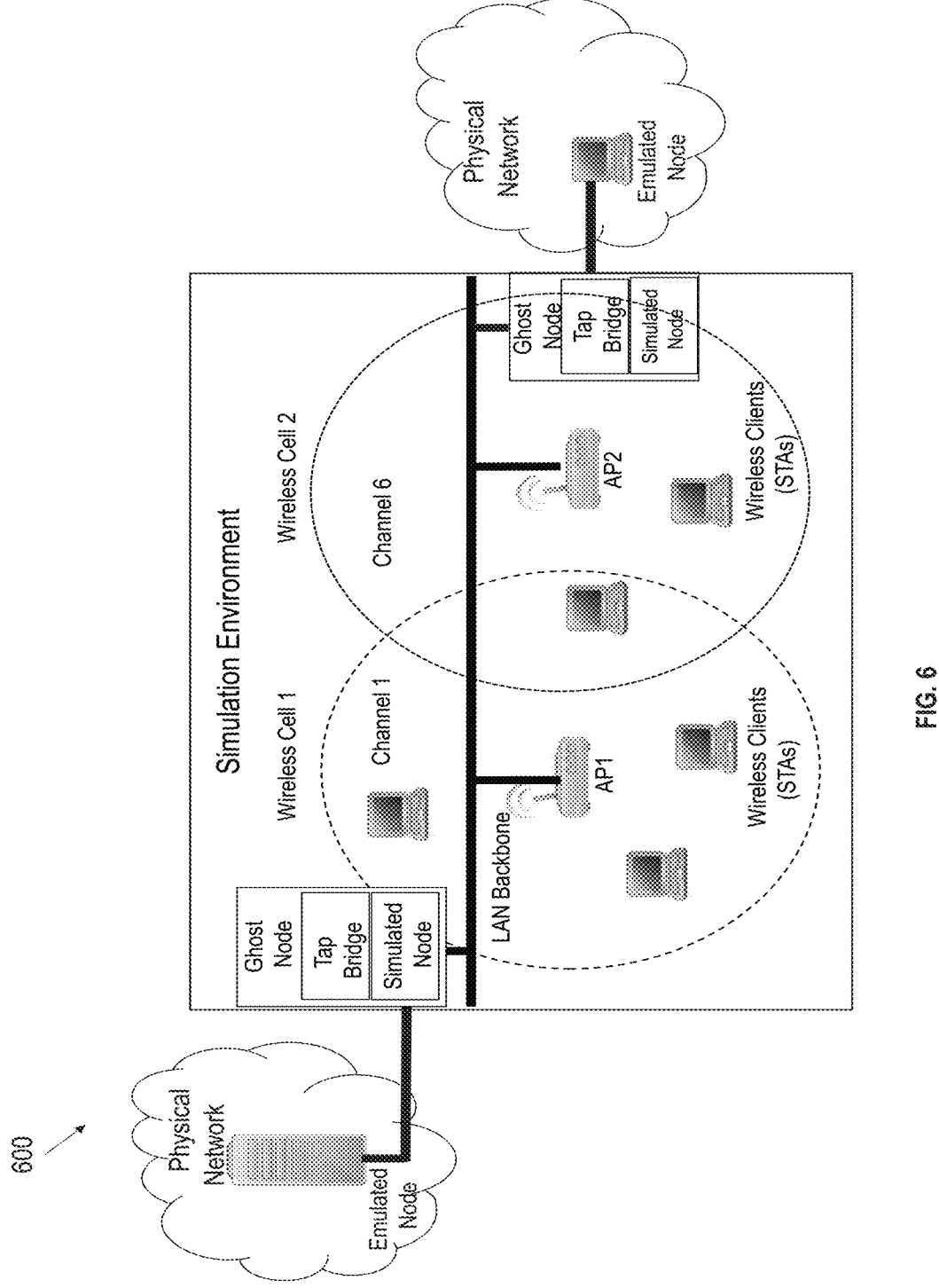
FIG. 6 is a schematic diagram to illustrate an example of Wi-Fi topology, according to an embodiment of the present disclosure.

Referring now to the drawings, and more particularly to FIG. through FIG. 6, where similar reference characters denote corresponding features consistently throughout the figures, there are shown preferred embodiments and these embodiments are described in the context of the following exemplary system and/or method.

FIG. 1 illustrates an exemplary system (100) for providing an emulation as a service (EaaS) framework for communication networks, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user a portable computer, a personal digital assistant, a handheld device, a smartphone, a tablet computer, a workstation, and the like. The I/O interface (104) are communicatively coupled to the system (100) through a communication network (106).

In an embodiment, the communication network (106) may be a wireless or a wired network, or a combination thereof. In an example, the communication network (106) can be implemented as a computer network, as one of the different types of networks, such as virtual private network (VPN), intranet, local area network (LAN), wide area network (WAN), the internet, and such. The communication network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the communication network (106) may include a variety of network devices, including routers, bridges, servers, computing devices, storage devices. The network devices within the communication network (106) may interact with the system (100) through communication links.

The system (100) supports various connectivity options such as BLUETOOTH®, USB, ZigBee and other cellular services. The communication network (106) environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
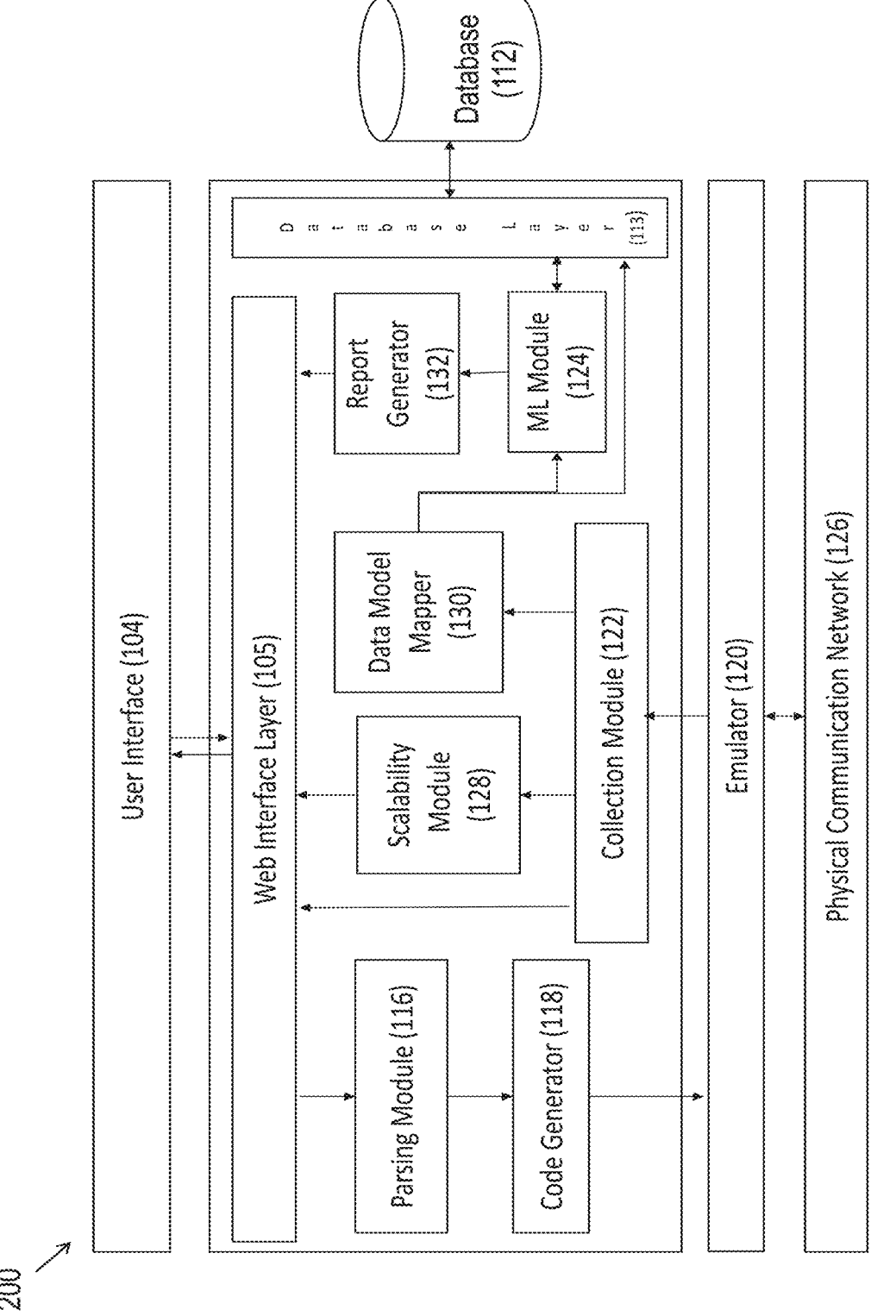
FIG. 2 is a functional block diagram to illustrate a system for providing an emulation as a service (EaaS) framework, according to an embodiment of the present disclosure.

Referring FIG. 2, a functional flow diagram (200) of the system (100) for providing an emulation as a service (EaaS) framework for communication networks, in accordance with an example embodiment. The system (100) comprises at least one memory with a plurality of instructions, one or more databases (112), one or more input/output (I/O) interfaces (104) and one or more hardware processors (108) which are communicatively coupled with the at least one memory to execute a plurality of modules (114) therein. Further, the system (100) comprises a parsing module (116), a code generator (118), an emulator (120), a collection module (122), a machine learning (ML) module (124), a physical communication network (126), a scalability module (128), a data model mapper (130) and a report generator (132).

The one or more I/O interfaces (104) are configured to receive one or more configuration parameters of a communication network and a configuration file from a user, wherein the communication network comprising one or more resources. The one or more I/O interfaces (104) are configured to convey the predicted at least one policy to enhance performance of the communication network from the system (100) back to the user via a web interface layer (105). Herein the one or more resources of the communication network includes a frequency channel, a bandwidth, a node computational power, and a node transmission power.

In the preferred embodiment, the parsing module (116) of the system (100) is configured to parse the received one or more configuration parameters of the communication network to define a topology of the communication network based on the received configuration file. The one or more configuration parameters are for the configuration of the communication network such as wireless settings. It is to be noted that for the demonstration purpose a Wireless Fidelity (Wi-Fi) communication network is emulated but the EaaS framework can be used for any other wireless communication networks as well. The one or more configuration parameters for configuring the Wi-Fi communication network are for example wireless mode (Access point, Hub, Bridge), radio mode (IEEE 802.11 standard), channel (desired channel frequencies) etc. and environment parameters for setting up the communication network environment for example, indoor/outdoor, pathloss models, station mobility models etc. Further, a JavaScript Object Notation (JSON) file format is considered for providing user input but it is not restricted to this format type only. The JSON file format is just an example of input format, the system (100) is configured to send in other formats and that can be parsed through the parsing module (116) via a web interface layer (105).

Further, the parsing module (116) of the system (100) takes input data and builds a hierarchical structure, giving a structural representation of the input while checking for correct syntax. This is done, so that, the user input data is transformed into a more readable data format that can be easily understood by the lower layer i.e. the code generator. The code generator (118) of the system (100) is configured to generate an emulation script based on the defined topology of the communication network. The code generator (118) provides a quick and easy way to automatically generate emulation scripts.

In one instance, eXtensible Markup Language (XML) is considered as a predefined format of the parser output. The XML for the code generator (118) can be generated by parsing the JSON file into the parsing script. The generated XML is given as input to the code generator (118). The XML file declares and defines the list of parameters used in the simulation scripts. It further helps in defining the communication network topology of the simulation.

In another instance, to show case capability of the code generator (118), an emulation script is generated in C++, which is well understood by an emulator (120) used in the lower layer. The XML generated by the parser is given as an input to the code generator. The code generator (118) incorporates the code synthesis XML Schema Definition (XSD) product to validate XML script which is provided by the parsing module (116) and generate a C++ data bindings to allow for easier parsing of the XML file used to define a communication network topology.

In the preferred embodiment, the emulator (120) of the system (100) is configured to execute the generated emulation script to get one or more emulated nodes. It is to be noted that once the system starts the script then based on the inputs provided by the user, the simulated communication network environment and the simulated communication network devices are created. Along with these simulated nodes, one or more emulated nodes are also created which will help physical devices to participate in the simulation and allow simulation nodes to send and receive packets over the communication network in real-time. The emulation results obtained for a smaller communication network can be extrapolated by the scalability module (128) along with the information received from the trained ML model for predicting the performance of a larger communication network emulations.

Figure 3:
FIG. 3 is a schematic diagram to illustrate layers of the EaaS framework, in accordance with some embodiments of the present disclosure.

Referring FIG. 3 to illustrate a block diagram (300) of the emulation as a service (EaaS) framework, according to an embodiment of the present disclosure. It is to be noted that the emulator (120) of the system (100) acts as a base layer with necessary APIs to enable customized inclusion of analytics and benchmark the analytics performance. The EaaS framework creates a scenario specific simulation script, generates data imitating physical communication network (126), collects the data in a specific format and finally stores it in a database through a database layer (113). It would dynamically create the necessary data flow paths to allow the distributed data collection and storage by the individual nodes. The customization of the simulation model would depend on specific communication network scenarios.

Herein, an architecture of the EaaS framework which is based on a layered Service Oriented Architecture (SOA)-Reference Architecture (SOA-RA), introduces the functionality of emulation by modifying SOA-RA by adding a new layer called emulation environment layer at the bottom. This layer signifies the interfacing between the physical devices and the system software to exchange real-time data to and from the emulation environment. There are multiple web services implemented to generate user specific communication network scenarios and finally collect the generated one or more logs through a customizable data collection points.

It would be appreciated that the EaaS layers are modelled after the SOA-RA layers. The architecture of EaaS framework is decomposed into multiple layers, similar to the SOA-RA layering structure, and each layer includes a set of architecture building blocks that provide some capability. Some of the layers are cross-cutting or supporting layers which have common functionality that spans across the layers and rest horizontal layers support the functional capabilities of the architecture. The five horizontal layers namely emulation environment layer, operational systems layer, service component layer, services layer and business process and consumer layer. These layers support the functional capabilities of the architecture. Three of the horizontal layers address the implementation and interface with a service (the operational systems layer, the service component layer, and the services layer). Next three layers support the consumption, integration, and collaboration of services (the business process and consumer layer, the orchestration layer, and the integration layer). The last two cross-cutting layers (the information layer and the security layer) concerns of supporting (sometimes called non-functional or supplemental) activities. These layers provide the ability to transform data in a unified format and to authenticate/authorize for service invocation, respectively. The architecture as a whole provides the EaaS framework for the support of all the modules that provide emulation services and their interactions.

In another embodiment, the emulator (120) of the system (100) is used to configure one or more virtual interfaces, one or more bridges, and one or more routes for integrating one or more emulated nodes with at least one physical device. The at least one physical device participates in a simulation and allows one or more simulation nodes to send and receive packets over a physical communication network (126) in real-time. In order to create an emulated environment and integrate physical devices with the emulated nodes multiple steps are to be followed. The configuration file supplied by the user contains information about the number of nodes to be emulated and about the communication network topology. Based on this information, the emulation script created by the code generator (118) initiates to create and configure all virtual interfaces, bridges and routes that are needed for connecting physical devices to the emulator (120). Once the EaaS framework configuration is finished, standard emulation scenario is started.

In another embodiment, the collection module (122) of the system (100) is configured to collect one or more logs from the emulation in a predefined format. Once the emulation process is over, the one or more logs generated out of the emulation are collected in a predefined format in a file. For example, herein the collected one or more logs are in a time series output and these traces are added in a Comma-Separated Value (CSV) file format. Though CSV file format is used to save the logs, instead any delimited text file can be used that has a field separator to separate each data point. The parsing module (116) takes CSV log generated by the emulator (120), reads them, maps them to any unified format and pushes to a database layer. It is to be noted that the file with data properties is very important for emulation service as it contains all the required details for the system to work, for example, database layer information, database connection details, serializers etc.

In one embodiment, the machine learning (ML) module (124) of the system (100) is trained with the collected one or more logs, wherein the collected one or more logs are used for prescribing the communication network configuration. One of the main points of running emulations is to generate output data, which can later be used for prescribing the communication network configuration based on the behavior of the emulation results. The historical data collected from the database are passed through the ML module (124) which shall further be used for training the ML module and get a trained ML model for data predictions. The data analysis and prediction process are applied over both, the historical data stored in the database as well as the generated one or more logs. Historical data is a data which was stored previously in database for a similar setup. Further, the trained ML model of the system (100) is configured to analyze the generated one or more logs and historical data stored in a database to predict at least one policy to enhance performance of the communication network by provisioning one or more communication network resources using the trained ML model.

Figure 4A:
FIGS. 4A and 4B show a functional flow diagram to illustrate the EaaS framework, in accordance with some embodiments of the present disclosure.
Figure 4B:
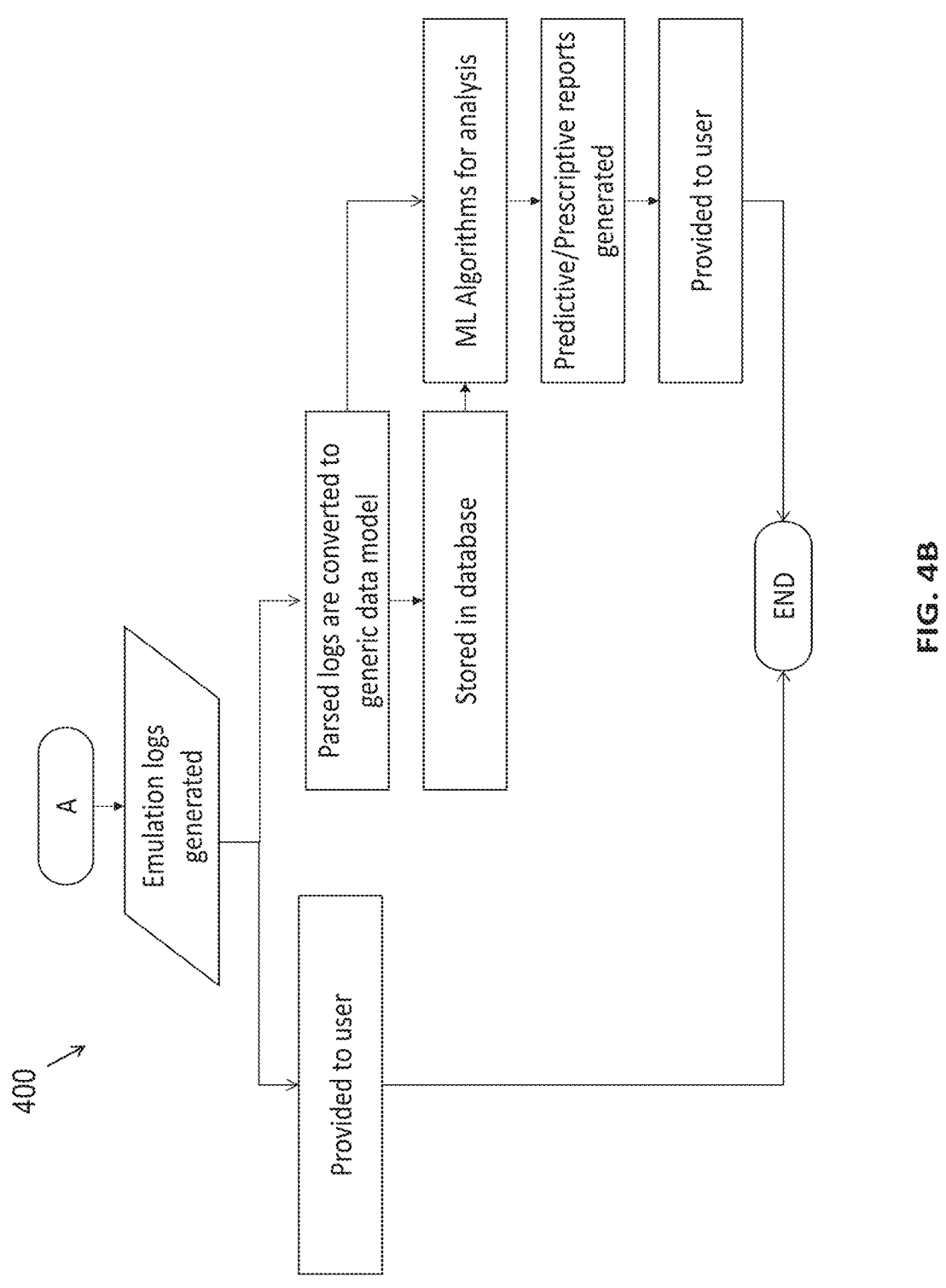

Referring FIGS. 4(a) & (b), a functional flow diagram (400) to illustrate the EaaS framework for communication networks. A user interface provides front end interface to communication network administrators/external users to provide authentication and sends requests and information to the one or more modules of the system. The web interfaces are configured to listen for communication network service requests from an application or a user. It provides capabilities such as get information, create, or update or delete requests for a particular task. APIs for creating communication network topology script, generating synthetic data, and verifying new communication network policies and generating reports. Further, the web interface sends appropriate responses back to the user. The code generator is used to process the emulation requests and generate the user specific scripts to emulate the desired communication network. Further, the system is configured to gather information about communication network Key Performance Indicators (KPIs) and communication network health etc.

Referring FIG. 5, a flow diagram (500) to illustrate a processor-implemented method for providing an emulation as a service (EaaS) framework for communication networks is provided.

Initially, at the step (502), receiving one or more configuration parameters of a communication network, a configuration file from a user and historical data of at least one emulation from one or more database.

At the next step (504), the received one or more configuration parameters of the communication network are parsed to define a topology of the communication network based on the received configuration file. The EaaS framework creates a scenario specific simulation script. The customization of the simulation model would depend on specific communication network scenarios.

Referring FIG. 6, a schematic diagram (600), an enterprise IEEE 802.11 Wi-Fi communication network is set-up comprising of number of static access points (APs) and number of connected mobile stations (STAs). Each of the STAs are using Transmission Control Protocol (TCP) applications to exchange data packets. Based on the above topology, examples of various configuration parameters are number of APs, number of stations connected to each AP, channel number, transmission power of an AP, transmission mode, TCP Application data rate, packet size, etc.

At the next step (506), generating emulation script based on the defined topology of the communication network using a code generator (118). The Code generator provides an ability to generate a code for emulation. For example, the code generator used here to demonstrate the functioning of EaaS, uses code synthesis XSD product to validate XML provided by the upper layer which defines communication network topology parameters provided by the users. The code generator generates the XML to C++ data bindings.

At the next step (508), executing the generated emulation script in an emulator (120) to get one or more emulated nodes. The goal is to make simulated node appear to a host node. To achieve this, simulated nodes are emulated using TapBridge and NetDevice. The TapBridge and NetDevice is used to integrate hosts with a simulation. A tap device will be created and configured by the simulator. The simulated node with the presence of a TapBridge is a ghost node which is used to hold the bridged simulated net device and the TapBridge. This node does not actually do anything but makes the simulated node appear to the host OS. Hence, the emulated nodes provide abstractions of computing nodes with applications to generate traffic. With this support, real-time applications are used without assembling large communication networks of physical devices. The above-mentioned example of creating emulated nodes is with respect to a particular emulator. If any other emulator is used, then the concept of ghost node, TapBridge, and NetDevice will change.

At the next step (510), configuring one or more virtual interfaces, one or more bridges, and one or more routes for connecting at least one physical device to the emulator (120).

At the next step (512), integrating one or more emulated nodes with at least one physical device, wherein the at least one physical device participates in a simulation and allows one or more simulation nodes to send and receive packets over a physical communication network (126) (for example Wi-Fi communication network as in the illustrated example with physical APs) in real-time. Emulation allows a simulation node to send and receive packets over a physical communication network (126). The physical devices of the physical communication network (126) are integrated with the emulated nodes.

At the next step (514), collecting one or more logs from the emulation in a predefined format, wherein the collected one or more logs are used for prescribing the communication network configuration. Herein, the predefined format of the generated one or more logs is converted to a unified format based on the data model mapper (130).

At the next step (516), a machine Learning (ML) module is trained with historical data from the at least one database to get a trained ML model. Herein, the historical data is a data which was stored previously in database for a similar setup.

At the next step (518), analyzing the generated one or more logs using the trained ML model. Once the simulation script is executed it generates a time series output data, which is called as log data, used at a later stage for the purpose of analyzing the communication network behavior with respect to different configuration parameters. The support for generating time series output data and saving it to a log file has been added. Though the log file can be presented in any format, for an example CSV format is used to save the generated log file. The log file comprising of the operational values such as simulation time, number of connected station with each AP, throughput of each AP, total received bytes, total transmitted bytes, busy period etc.

At the last step (520), predicting at least one policy to enhance performance of the communication network by provisioning one or more communication network resources based on the analysis output. It would be appreciated that the predicted at least one policy is stored in a database and a report is generated by the report generator (132) is reported back to the user via the I/O interface. Thus, the emulator addresses the problem of scarcity of training data for different communication networking domains and also inability to test the analytics algorithms due to lack of test batch. Further, the EaaS paradigm offers advantages through standalone and remote accessibility of emulation environment, better utilization of emulation to a large number of users whenever and wherever needed and reduction of operation costs.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of interoperability between different Emulation tools. At present there is no common framework available which provides a northbound interface to the users and a southbound interface to integrate and support different emulators. Therefore, embodiments herein provide a system and method for providing an emulation as a service (EaaS) framework for communication networks. Herein, the EaaS aims to provide a user with discoverable services that are readily available on-demand and deliver a choice of applications in a flexible and adaptive manner. It includes advantages over the traditional emulation paradigm in which the users are highly dependent on a limited amount of industry partners and subject matter experts. The allied framework for EaaS defines user-facing capabilities (front-end) and underlying core functional infrastructure (back-end). The front end is called the EaaS portal. The front end provides access to a large variety of emulation capabilities from which the user is able to select the services that best suit their requirements and track the experiences It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for providing an emulation as a service (EaaS) framework for a communication network comprising:

receiving, via an input/output interface, one or more configuration parameters of the communication network, a configuration file from a user and a historical data of at least one emulation from one or more database, wherein the communication network comprising one or more resources, wherein the one or more configuration parameters are number of access points (APs), number of stations connected to each AP, a channel number, a transmission power of the AP, a transmission mode, a data rate associated with a transmission control protocol (TCP) application, and a packet size;

parsing, via one or more hardware processors, the received one or more configuration parameters of the communication network to define a topology of the communication network based on the received configuration file;

generating, via the one or more hardware processors, an emulation script based on the defined topology of the communication network using a code generator;

executing, via the one or more hardware processors, the generated emulation script in an emulator to get one or more emulated nodes, wherein the emulator acts as a base layer with an Application Programming Interface (API);

configuring, via the one or more hardware processors, one or more virtual interfaces, one or more bridges, and one or more routes for connecting at least one physical device to the emulator;

integrating, via the one or more hardware processors, the one or more emulated nodes with the at least one physical device, wherein once the emulation script is started, then based on the one or more configuration parameters, the one or more emulated nodes are created along with one or more simulation nodes allowing the at least one physical device in a simulation, and allows the one or more simulation nodes to send and receive packets over a physical communication network in real-time, wherein the one or more emulated nodes provide abstractions of computing nodes with applications to generate traffic, thereby real-time applications are used without assembling the physical communication network of the at least one physical device;

collecting, via the one or more hardware processors, one or more logs from the emulation in a predefined format, wherein the collected one or more logs are used for prescribing the communication network configuration;

training, via the one or more hardware processors, a machine learning (ML) module with the collected one or more logs to get a trained machine learning (ML) model;

analyzing, via the one or more hardware processors, the collected one or more logs and the historical data stored in a database using the trained ML model to get an analysis output; and predicting, via the one or more hardware processors, at least one policy to enhance performance of the communication network by provisioning the one or more resources of the communication network based on the analysis output using the trained ML model, wherein the EaaS framework dynamically creates data flow paths to allow distributed data collection and storage by individual nodes.

2. The processor-implemented method of claim 1, wherein the predefined format of the collected one or more logs is converted to a unified format based on a data model mapper.

3. The processor-implemented method of claim 1, wherein the one or more resources of the communication network comprising a frequency channel, a bandwidth, a node computational power, and a node transmission power.

4. A system for providing an emulation as a service (EaaS) framework for a communication network comprising:

one or more hardware processors;

a memory in communication with the one or more hardware processors to execute programmed instructions stored in the memory, wherein the one or more hardware processors are configured by the programmed instructions to:

receive one or more configuration parameters of the communication network, a configuration file from a user and a historical data from a one or more databases, wherein the communication network comprising one or more resources, wherein the one or more configuration parameters are number of access points (APs), number of stations connected to each AP, a channel number, a transmission power of the AP, a transmission mode, a data rate associated with a transmission control protocol (TCP) application, and a packet size;

parse the received one or more configuration parameters of the communication network to define a topology of the communication network based on the received configuration file;

generate an emulation script based on the defined topology of the communication network;

execute the generated emulation script to get one or more emulated nodes, wherein the emulator acts as a base layer with an Application Programming Interface (API), wherein the emulator is used to configure one or more virtual interfaces, one or more bridges, and one or more routes to integrate the one or more emulated nodes with at least one physical device, wherein once the emulation script is started, then based on the one or more configuration parameters, the one or more emulated nodes are created along with one or more simulation nodes allowing the at least one physical device to participate in a simulation, and allows the one or more simulation nodes to send and receive packets over a physical communication network in real-time, wherein the one or more emulated nodes provide abstractions of computing nodes with applications to generate traffic, thereby real-time applications are used without assembling the physical communication network of the at least one physical device;

collect one or more logs from the emulation in a predefined format, wherein the collected one or more logs are used for prescribing the communication network configuration; and train a machine learning module with the collected one or more logs to get a trained machine learning (ML) model, wherein the collected one or more logs and the historical data stored in a database is analyzed to predict at least one policy for enhancing performance of the communication network by provisioning the one or more resources of the communication network, wherein the EaaS framework dynamically creates data flow paths to allow distributed data collection and storage by individual nodes.

5. The system of claim 4, wherein the predefined format of the collected one or more logs is converted to a unified format based on the data model mapper.

6. The system of claim 4, wherein the one or more resources of the communication network comprising a frequency channel, a bandwidth, a node computational power, and a node transmission power.

7. A non-transitory computer readable medium storing one or more instructions which when executed by one or more processors on a system, cause the one or more processors to perform method for providing an emulation as a service (EaaS) framework for a communication network comprising:

receiving, via an input/output interface, one or more configuration parameters of the communication network, a configuration file from a user and a historical data of at least one emulation from one or more database, wherein the communication network comprising one or more resources, wherein the one or more configuration parameters are number of access points (APs), number of stations connected to each AP, a channel number, a transmission power of the AP, a transmission mode, a data rate associated with a transmission control protocol (TCP) application, and a packet size;

parsing the received one or more configuration parameters of the communication network to define a topology of the communication network based on the received configuration file;

generating an emulation script based on the defined topology of the communication network using a code generator;

executing the generated emulation script in an emulator to get one or more emulated nodes, wherein the emulator acts as a base layer with an Application Programming Interface (API);

configuring one or more virtual interfaces, one or more bridges, and one or more routes for connecting at least one physical device to the emulator;

integrating the one or more emulated nodes with the at least one physical device, wherein once the emulation script is started, then based on the one or more configuration parameters, the one or more emulated nodes are created along with one or more simulation nodes allowing the at least one physical device in a simulation, and allows the one or more simulation nodes to send and receive packets over a physical communication network in real-time, wherein the one or more emulated nodes provide abstractions of computing nodes with applications to generate traffic, thereby real-time applications are used without assembling the physical communication network of the at least one physical device;

collecting one or more logs from the emulation in a predefined format, wherein the collected one or more logs are used for prescribing the communication network configuration;

training a machine learning (ML) module with the collected one or more logs to get a trained machine learning (ML) model;

analyzing the collected one or more logs and the historical data stored in a database using the trained ML model; and predicting at least one policy to enhance performance of the communication network by provisioning the one or more resources of the communication network based on the analysis output using the trained ML model, wherein the EaaS framework dynamically creates data flow paths to allow distributed data collection and storage by individual nodes.

* * * * *